(12) United States Patent
Fischer (10) Patent No.: US 10,877,139 B2
(45) Date of Patent: Dec. 29, 2020

(54) RADAR SYSTEM OF A VEHICLE AND METHOD FOR DETECTING AN OBJECT IN STANDSTILL SITUATION

(71) Applicant: Aptiv Technologies Limited, St. Michael (BB)

(72) Inventor: Thomas Fischer, Wenden (DE)

(73) Assignee: Aptiv Technologies Limited, St. Michael (BB)

( * ) Notice: Subject to any disclaimer, the term of this patent is extended or adjusted under 35 U.S.C. 154(b) by 196 days.

(21) Appl. No.: 16/131,162

(22) Filed: Sep. 14, 2018

(65) Prior Publication Data

US 2019/0120951 A1 Apr. 25, 2019

(30) Foreign Application Priority Data

Sep. 28, 2017 (EP) ..................................... 17193798

(51) Int. Cl.
| | |
|---|---|
| *G01S 13/06* | (2006.01) |
| *G01S 13/04* | (2006.01) |
| *G01S 13/931* | (2020.01) |
| *H01Q 3/20* | (2006.01) |
| *B60W 30/08* | (2012.01) |

(Continued)

(52) U.S. Cl.
CPC .............. *G01S 13/04* (2013.01); *B60W 30/08* (2013.01); *B60W 30/18027* (2013.01); *G01S 13/931* (2013.01); *G05D 1/0257* (2013.01); *H01Q 3/20* (2013.01); *B60W 2300/125* (2013.01); *B60W 2420/52* (2013.01); *B60W 2554/00* (2020.02); *B60W 2720/106* (2013.01); *G01S 2013/9319* (2020.01); *G01S 2013/93271* (2020.01); *G01S 2013/93274* (2020.01)

(58) Field of Classification Search
CPC .. B60W 30/08; B60W 30/18027; G01S 13/04
See application file for complete search history.

(56) References Cited

U.S. PATENT DOCUMENTS

| | | | |
|---|---|---|---|
| 6,580,385 B1 * | 6/2003 | Winner | G01S 13/865 342/70 |
| 2005/0131646 A1 * | 6/2005 | Camus | G01S 3/7864 701/301 |

(Continued)

FOREIGN PATENT DOCUMENTS

| | | |
|---|---|---|
| DE | 10 2009 047390 A1 | 6/2011 |
| DE | 10 2016 103203 A1 | 8/2017 |
| WO | 2016/181618 A1 | 11/2016 |

*Primary Examiner* — Jess Whittington
(74) *Attorney, Agent, or Firm* — Colby Nipper PLLC (57) ABSTRACT

A radar system includes a controller that receives radar data from a first radar sensor and a second radar sensor mounted to a vehicle. The controller determines, based on fields of view of both the first radar sensor and the second radar sensor, reduced fields of view that overlay a travel path of the vehicle. The reduced fields of view are enabled by reflecting portions of transmitted radar signals away from both the first radar sensor and the second radar sensor, thereby inhibiting detections of objects outside of the travel path of the vehicle. The controller determines whether a stationary object is detected by both the first radar sensor and the second radar sensor in the reduced fields of view while the vehicle is stationary.

20 Claims, 5 Drawing Sheets

(51) Int. Cl.
*B60W 30/18* (2012.01)
*G05D 1/02* (2020.01)

(56) References Cited

U.S. PATENT DOCUMENTS

| | | | |
|---|---|---|---|
| 2007/0205938 A1* | 9/2007 | Zimmermann | G01S 13/87 342/69 |
| 2008/0136702 A1* | 6/2008 | Tsuchihashi | G01S 13/34 342/27 |
| 2009/0248267 A1* | 10/2009 | Boecker | B60W 30/17 701/70 |
| 2012/0089299 A1* | 4/2012 | Breed | B60N 2/888 701/36 |
| 2014/0176321 A1* | 6/2014 | Chen | B60W 30/14 340/435 |
| 2015/0234045 A1* | 8/2015 | Rosenblum | G01S 13/86 342/71 |
| 2015/0288948 A1* | 10/2015 | Schamp | H04N 5/33 348/47 |
| 2016/0327636 A1* | 11/2016 | Gazit | G01S 7/4972 |
| 2017/0261600 A1 | 9/2017 | Maennieck et al. | |

* cited by examiner

RADAR SYSTEM OF A VEHICLE AND METHOD FOR DETECTING AN OBJECT IN STANDSTILL SITUATION

TECHNICAL FIELD OF INVENTION

The present invention relates to a radar system and method for detecting an object in a standstill situation, and more particularly, to detect an object in the front portion of the vehicle when the vehicle and surrounded vehicles are in standstill situation.

BACKGROUND OF INVENTION

Short range radars are widely used for sensing of the environment around vehicles up to 360° around the vehicle. This sensor is performing well in driving scenarios to detect the outside but has limitations when everything is in standstill. When the environment and the vehicle is in standstill situation, the radar signal coming from a short range radar and reflected by an object does not produce any Doppler effect. More particularly, mono-pulse short range radar sensors SRR have no discrimination capability for azimuth. As long as the system is in movement a separation by relative speed and/or range is possible. The issue arises when the system is in standstill with no movement. Objects in the same range will be melted in azimuth to one target under some angle.

SUMMARY OF THE INVENTION

According to one embodiment, a method for controlling a radar system of a vehicle comprises the steps of: providing a left corner radar sensor mounted at the front left corner of the vehicle and providing a right corner radar sensor mounted at the front right corner of the vehicle; transmitting an object detection radar signal from the left corner radar sensor with a field of view extending from a left side portion area to a front portion area covering respectively the left portion and the front portion of the vehicle; and transmitting another object detection radar signal from the right corner radar sensor with another field of view extending from a right side portion area to another front portion area covering respectively the right portion and the front portion of the vehicle; reducing each field of view of each corner radar sensor to their front portion; and monitoring the presence of an object in the common field of view of the front portion areas of each field of view of both corner radar sensors.

The method may further comprises the step of triggering an alert if the object is detected by both right and left corner radar sensors in a distance range less than a safety distance threshold representative of the minimum safety distance for which the vehicle may automatically operate in a go function from a standstill situation. The safety distance threshold may be in the range of 2 to 3 meters. The step of reducing each field of view of each corner radar sensor may comprises the steps of blocking each portion of each object detection radar signal that would have covered each side portion area of each field of view. The step of blocking each side portion area of each field of view may comprises the step of reflecting out of each corner radar sensor the portion of each object detection radar signal that would have covered the side portion area of the field of view of each corner radar sensor.

According to one embodiment, a method for controlling a stop and go system of a vehicle whereby the vehicle may automatically operates in a go mode from a standstill situation comprising the steps of the method for controlling a radar system and further comprising the step of preventing the go function of the vehicle from a standstill situation if the alert is triggered.

According to a preferred embodiment a radar system for vehicle comprises a left corner radar sensor configured to be mounted on the front left corner of a vehicle, a right corner radar sensor configured to be mounted on the front right corner of a vehicle, the left corner radar sensor being configured to transmit an object detection radar signal in a field of view extending from a left side portion area to a front portion area covering respectively the left portion and the front portion of the vehicle, the right corner radar sensor being configured to transmit another object detection radar signal in another field of view extending from a right side portion area to another front portion area covering respectively the right portion and the front portion of the vehicle, the radar system further comprises a field of view control means configured to reduce each field of view of each corner radar sensor to their front portion area, and a radar system controller configured to monitor the presence of an object in the common field of view of the front portion area of each field of view of each corner radar sensor.

The radar system for vehicle may be further configured to trigger an alert if the object is detected by each corner radar sensor in a distance range less than a safety distance threshold representative of the minimum safety distance for which the vehicle may automatically operate in a go function from a standstill situation. The safety distance threshold may be in the range of 2 to 3 meters. The field of view control means may comprise a right shutter and a left shutter respectively mounted on the right corner radar sensor and on the left corner radar sensor, each shutter being configured to block each portion of each object detection radar signal that would have covered each side portion area of each field of view. Each shutter may be configured to reflect out of each radar sensor each portion of each object detection radar signal that would have covered each side portion area of each field of view. Each shutter may comprise motion means configured to adjust each shutter above the transmission antenna of each corner radar sensor such that each shutter cover a desired portion each field of view. The radar system controller may be further configured to control the motion means. The left and the right corner radar sensor may be both mono-pulse short range radar.

In another preferred embodiment, a vehicle equipped with a stop and go system configured to automatically operates in a go mode from a standstill situation comprises the radar system and further comprises a stop and go controller configured to prevent the go function of the vehicle from a standstill situation if the alert is triggered.

Other objects and advantages of the present invention will become apparent from the following description.

BRIEF DESCRIPTION OF DRAWINGS

Other features, objects and advantages of the invention will become apparent from reading the detailed description that follows, and the attached drawings, given by way of example and in which.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

'One or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for describing embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Figure 1:
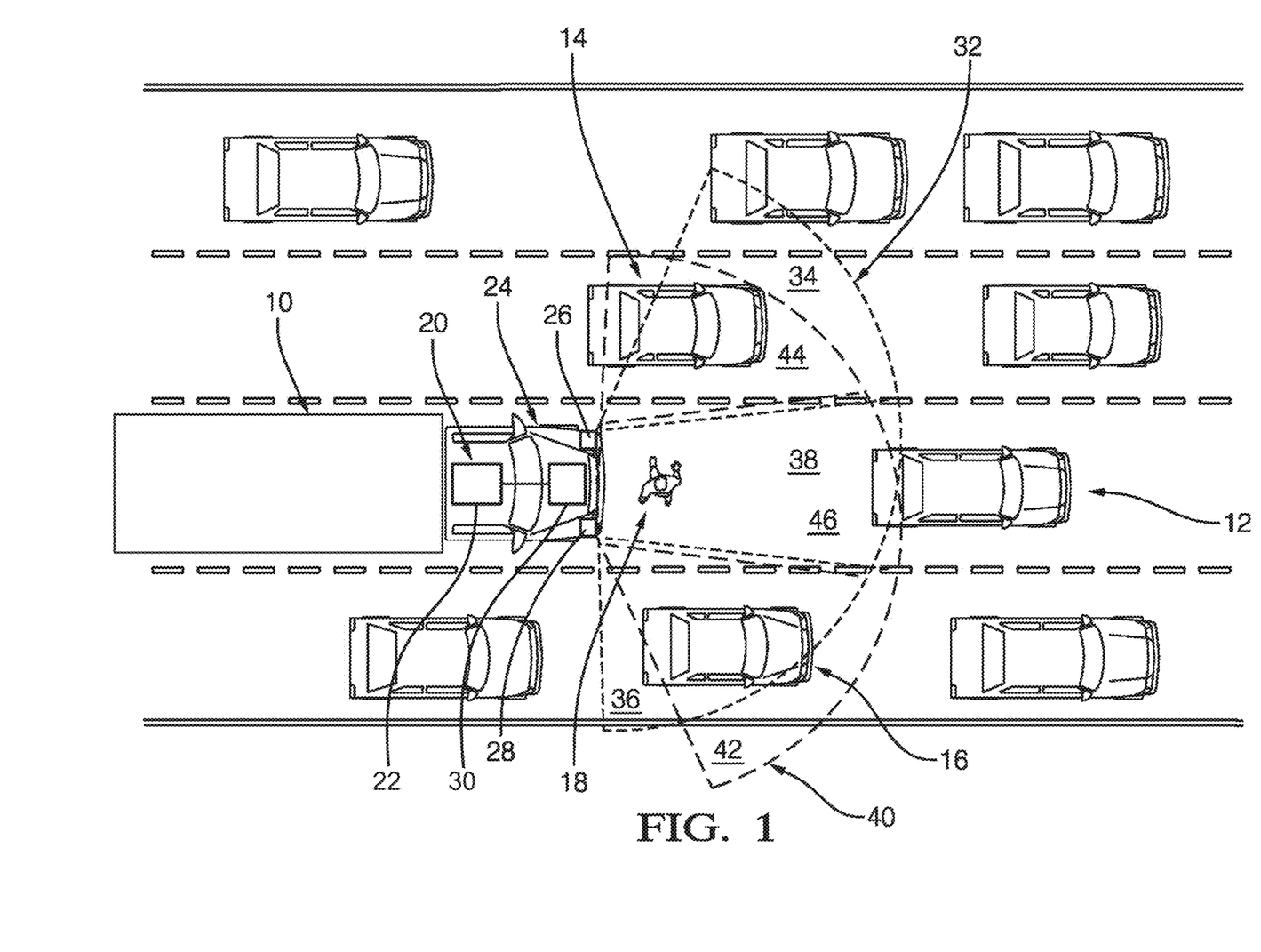
FIG. 1 is a schematic diagram of a heavy truck in a standstill environment and equipped with a radar system.

According to FIG. 1, a heavy truck 10 is in a traffic jam in a standstill situation. Other vehicles are located around the heavy truck 10. More particularly, a first vehicle 12 is located in front of the heavy truck 10 on the same lane. A second vehicle 14 and a third vehicle 16 are respectively located at the front left side and at the front right side of the heavy truck 10, nearby the heavy truck 10. The second vehicle 14 and the third vehicle 16 are respectively located on the left lane adjacent to the heavy truck 10 and on the right lane adjacent to the heavy truck 10. Both second vehicle 14 and third vehicle 16 are in standstill situation. A pedestrian 18 is located nearby and in front of the heavy truck 10. An object, as per example a vehicle or a pedestrian, located nearby the heavy truck 10 is an object located at less than few meters, as per example less than 3 meters, from the heavy truck.

The heavy truck 10 is equipped with a stop and go system 20 that permits the heavy truck 10 to go forward after a standstill situation in an autonomous manner, i.e. without a driver action. The stop and go system 20 comprises a stop and go controller 22 that provides control on a go function and on a stop function of the heavy truck 10.

The heavy truck 10 is also equipped with a radar system 24. The radar system 24 is in communication with the stop and go system 20. The radar system 24 comprises a left corner radar sensor 26 and a right corner radar sensor 28 arranged at the front left corner and at the right front corner of the heavy truck 10. Preferably, both corner radar sensors 26, 28 are paced behind the front bumper of the heavy truck 10 at a high from the floor in the order of 300 millimeter to 700 millimeters. Both corner radar sensors 26, 28 are controlled by a radar system controller 30. The radar system controller 30 is in communication with the stop and go controller 22.

According to FIG. 1, the field of view 32 of the left corner radar sensor 26 extends from a left side portion area 34 to a residual right side portion area 36, a front portion area 38 being defined between the left side portion area 34 and the residual right side portion area 36. The left side portion area 34 and the front portion area 38 of the field of view 32 are respectively covering the left portion and the front portion of the heavy truck 10. The field of view 40 of the right corner radar sensor 28 extends from a right side portion area 42 to a residual left side portion area 44, another front portion area 46 being defined between the right side portion area 42 and the residual left side portion area 44. The right side portion area 42 and the other front portion area 46 of the field of view 40 are respectively covering the right portion and the front portion of the heavy truck 10. The residual side portion area 36, 44 of the field of view 32, 40 of a corner radar sensor 26, 28 is the portion of the field of view 32, 40 that extends opposite to the corner side wherein the radar sensor 26, 28 is arranged.

It should be noted that the field of view 32 of the left corner radar sensor 26 and the field of view 40 of the right corner radar sensor 28 comprise some overlapped area. According to the invention, a particular attention is about the common front area of both field of views that covers the front portion of the heavy truck 10 wherein an obstacle may be an issue for a go function of the stop and go system 20.

According to FIG. 1, as the pedestrian 18 and the second vehicle 14 are in the field of view 32 of the left corner radar sensor and globally at a same distance from the left corner radar sensor 26, the radar system 24 is in trouble to discriminate both detected objects 14, 18. According to FIG. 1, as the pedestrian 18 and the third vehicle 16 are in the field of view 40 of the right corner radar sensor 28 and globally at a same distance from the right corner radar sensor 28, the radar system 24 is in trouble to discriminate both detected objects 16, 18. According to such embodiment, the stop and go system 20 is not able to determine if the heavy truck 10 is able to go forward without a risk of collision with the pedestrian 18, as pedestrian 18 and both adjacent vehicles 14, 16 have not been discriminated.

As a non-limiting example, both corner radar sensors are mono-pulse short range radar sensors providing a field of view around 150 degrees. Both short range corner radar sensors may detect an object in a distance of few tens meters such as 60 meters.

Figure 2:
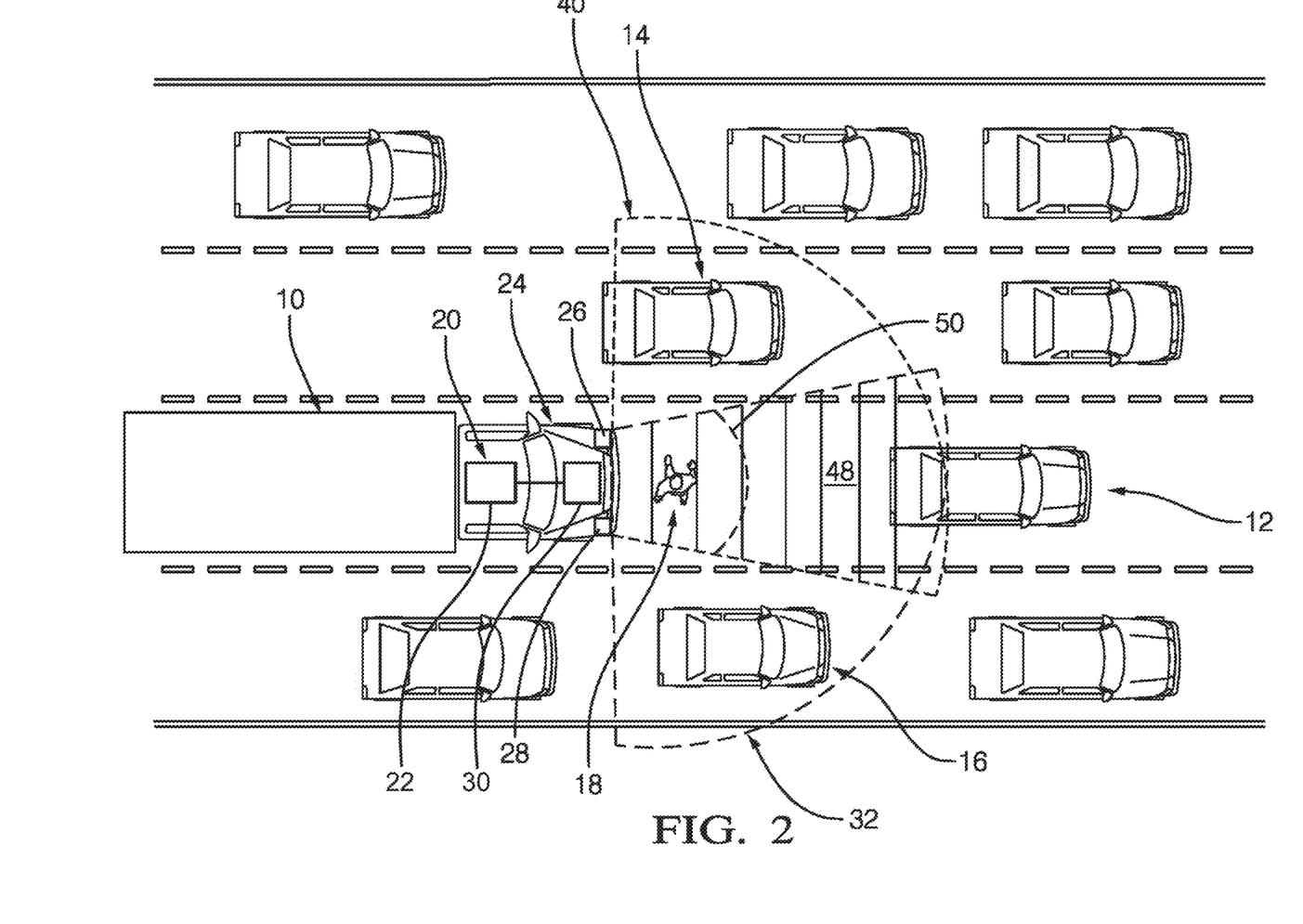
FIG. 2 is a schematic diagram of the heavy truck in a standstill environment as in FIG. 1 and equipped with the radar system according to a preferred embodiment.

FIG. 2 illustrates a preferred embodiment of the invention. The drawing shows the same situation of the heavy truck 10 as before. The embodiment further however includes a reduction of each field of view 32, 40 of each corner radar sensor 26, 28. More particularly, each field of view 32, 40 has been reduced such that the left side portion area 34 of the field of view 32 of the left corner radar sensor 26 and the right side portion area 42 of the field of view 40 of the right corner radar sensor 28 as illustrated on FIG. 1 have been suppressed. In such configuration, the common front portion 48 of both field of view 32, 40 is the intersection of both reduced field of view 32, 40 of both corner radar sensor 26, 28, i.e. the intersection of the front portion area 38, 46 of the field of view 32, 40 of each corner radar sensor 26, 28.

That suppression gives the advantage that for a very short distance range of detection, i.e. in in order of the width the heavy truck 10, the horizontal azimuth discrimination between an object located at a front side portion of the heavy truck 10 and at the front portion of the heavy truck 10 is not any more an issue. A detection of an object in such condition by each radar sensor is obviously a detection of the object in the front portion of the heavy truck 10 as the side portion area 34, 42 of the field of view 32, 40 has been suppressed.

In addition to the reduction of each field of view 32, 40, according to that preferred embodiment, the radar system 24 is monitoring the common field of view 48 of both corner radar sensors 26, 28, such that it may detect an object only in the front portion of the heavy truck 10 that is covered by the intersection of the front portion area 38 of the field of view 32 of the left corner radar sensor 26 and the front portion area 46 of the field of view 40 of the right corner radar sensor 40.

That intersection monitoring gives the advantage that for a distance range of detection greater than the width of the heavy truck 10, the horizontal azimuth discrimination between an object detected at the residual side portion area 36, 44 and at the front portion area 38, 46 of the field of view 32, 40 of each corner radar sensor 26, 28 is not any more an issue. A detection of an object in such condition by a combination of radar sensor detection is obviously a detection of the object in the front portion of the heavy truck 10 as the residual side portion area 36, 44 of each field of view 32, 40 are not part of the intersection of the fields of view 32, 40.

In this preferred embodiment, the radar system controller 30 is responsible for combining the result of the monitoring of both corner radar sensors 26, 28 with the reduced field of view 32, 40. The radar system controller 30 checks whether an object has been detected by both corner radar sensors 26, 28 at the same distance. If the object has been detected by both corner radar sensors 26, 28 at the same distance, the radar system controller 30 considers that the object may be in the forward direction of the heavy truck 10 as if the object was in the area of the common area 48 of both field of view 32, 40, that is to say in front of the heavy truck 10.

More particularly, the radar system controller 30 is triggering an alert if the object is detected by both right corner radar sensor 26 and left corner radar sensor 28 in a distance range less than a safety distance threshold 50 representative of the minimum safety distance for which the heavy truck 10 may automatically operate in a go function from a standstill situation. In other words, the safety distance is considered as a distance of the object for which the heavy truck 10 may restart without a risk of collision with the object. When restarted, the heavy truck 10 is not any more in a standstill situation and so azimuth discrimination is not any more an issue. In a motion situation, Doppler Effect of the reflected object detection signal helped on discrimination issue. As a non-limiting example the safety distance threshold 50 is in the range of 2 to 3 meters.

Figure 3:
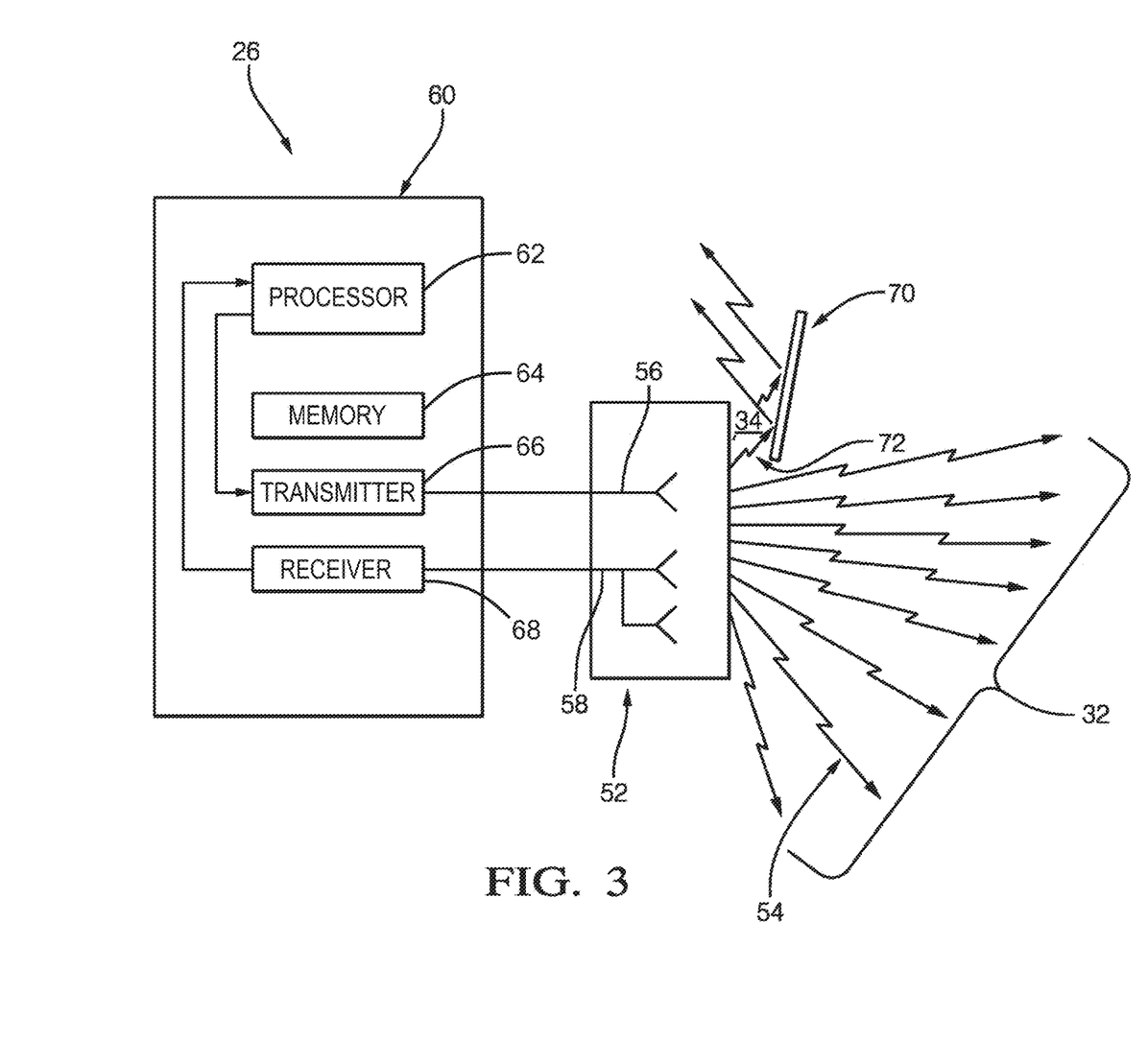
FIG. 3 is a schematic diagram of a corner radar sensor according to a preferred embodiment of the radar system according to the embodiment of FIG. 2.

FIG. 3 further illustrates non-limiting details of the left or the right corner radar sensor 26, 28 according to the preferred embodiment. The corner radar sensor 26 includes an antenna 52 configured to emit an object detection radar signal 54 and to detect a return signal characterized as a reflection of the object detection radar signal 54 reflected by an object in the field-of-view 32 of the antenna 52. More particularly, the antenna 52 comprises one transmission antenna 56 and two reception antennas 58. The transmission antenna 56 may comprise a planar array of transmission antenna elements. The reception antennas 58 may comprise planar arrays of reception antenna elements.

The corner radar sensor 26 includes a corner radar sensor controller 60. The corner radar sensor controller may include a processor 62 such as a microprocessor or other control circuitry such as analog and/or digital control circuitry including an application specific integrated circuit (ASIC) for processing data as should be evident to those in the art. The radar sensor controller 60 may include memory 64, including volatile memory such as SDRAM, and or including non-volatile memory such as electrically erasable programmable read-only memory (EEPROM) for storing one or more routines, thresholds and captured data. The one or more routines may be executed by the processor 62 to perform steps for determining if signals received by the corner radar sensor controller 60 indicate the presence of any object in the field-of-view 32. The corner radar sensor controller 60 may also include a transmitter 66 and a receiver 68 for coupling the antenna 52 to the corner radar sensor processor 62 as will be recognized by those in the art.

As described above, the corner radar sensor controller 60 is equipped with memory 64 for storing data such as samples of signals output by the receiver 68 which corresponds to the return signal. As such, the corner radar sensor controller 60, or more specifically the processor 62, is configured to receive a time-domain signal representative of the return signal detected by the antenna 52. The receiver 68 may include amplifiers and filters to condition the return signal from the antenna 52 to be suitable for the processor 62. The processor 62 may include an analog to digital converter or ADC (not shown) configured to sample the time-domain signal.

According to the preferred embodiment, the corner radar sensor 26 comprises a shutter 70 partially arranged above the antenna 52. More particularly, the shutter 70 is partially arranged above the array of transmission antenna elements such that a portion of the object detection radar signal 72 is reflected against the shutter 70. The shutter 70 is arranged in oblique relative to the planar array of transmission antenna elements such that said reflected signal is deviated out of the corner radar sensor antenna 52. Such portion of the object detection radar signal 72 reflected out of the corner radar sensor provides a reduction of the field of view 32 of the corner radar sensor 26. More particularly, the shutter 70 is arranged so that the side portion area of the field of view 34 is suppressed by reflecting out of the corner radar sensor the portion of the object detection radar signal 72 that would have covered the side portion area 34 of the field of view 32 of each corner radar sensor 26. For providing an efficient reflection, the shutter 70 may be a metal plate.

An alternative may have to block the portion of the object detection radar signal 72 that would have covered the side portion area 34 of the field of view 32 of each corner radar sensor 26 by using radar signal absorber. An alternative without a shutter 70 may be possible by controlling, via the corner radar sensor controller 60, the elements of the planar array of transmission antenna elements such that only a portion of said transmission antenna elements are transmitting the object detection signal 54.

Figure 4:
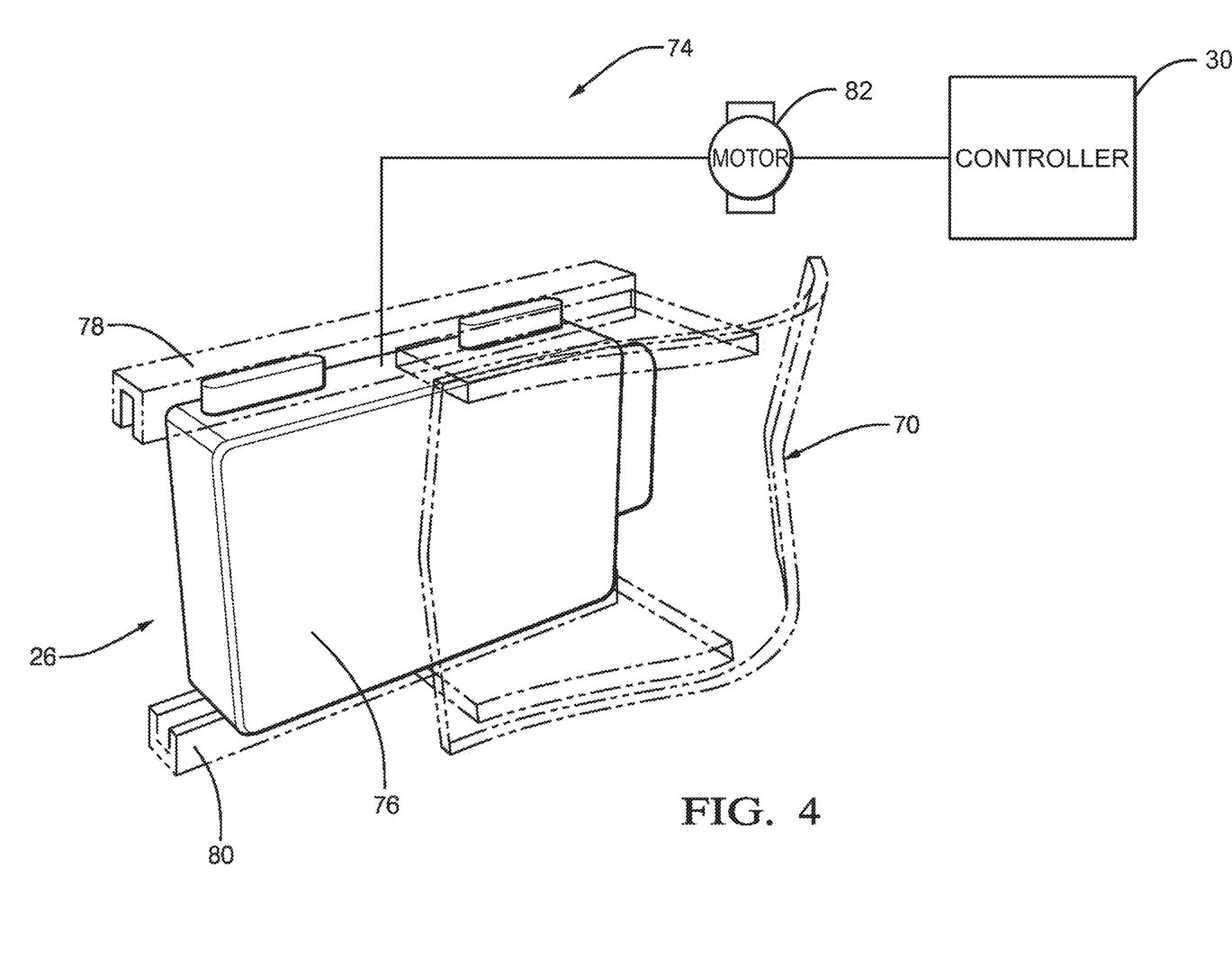
FIG. 4 is a schematic diagram of the corner radar sensor of FIG. 3 equipped with a motion means for the shutter.

FIG. 4 illustrates a particular embodiment for which the shutter 70 of the left or right corner radar sensor 26 is a movable shutter 70. The shutter 70 comprises motion means 74 configured to adjust each shutter 70 above the transmission antenna 56 of each corner radar sensor 26 such that each shutter 70 cover a desired portion each field of view 32. As such, the shutter 70 is fixed to the housing 76 of the corner radar sensor 26 on two lateral tracks 78, 80. The lateral tracks 78, 80 allow sliding off the shutter 70 above the planar transmission antenna 56 of the corner radar sensor 26. More particularly, the motion of the shutter 70 on the tracks 78, 80 is controlled by the radar system controller 30 via an electrical step by step motor 82 in order to get the desired field of view 32.

It should be noted that the invention is particularly useful for heavy trucks 10 because a camera placed behind the windscreen of the heavy truck 10 for monitoring the vision may not be able to monitor the presence of a pedestrian 18 or other object near the front part of the heavy truck 10 because the camera is too high relative to the front portion near the heavy truck 10 with the optical axis of the camera not being sufficiently inclined.

The invention is not limited to heavy truck 10. Other vehicles as car or truck may also be equipped with the corner radar system 24 and the stop and go system 20 as described in the invention.

The vehicle may also not be equipped with a stop and go system 20. The vehicles equipped with the corner radar sensors 26, 28 as described in the invention may help also a driver to avoid a collision with a pedestrian 18 by alerting the driver of the presence of a pedestrian 18 in front of the vehicle at a very short distance from the vehicle.

The invention is also not limited of a detection of a pedestrian 18. Any object may be detected in front of the vehicle without any ambiguities.

The radar system controller 30 may be one of the corner radar sensor controller 60 in condition that both corner radar sensors 26, 28 are in communication to each other.

Figure 5:
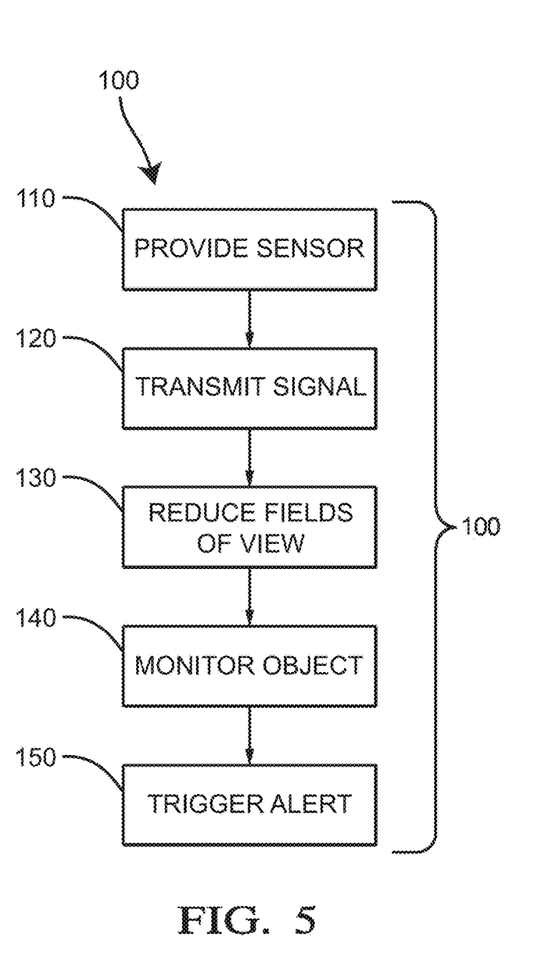
FIG. 5 is a schematic view of a block diagram of a method for controlling the radar system of a heavy truck according to the embodiment of FIG. 2.

FIG. 5 illustrates a non-limiting example of a method 100 for controlling the radar system 24 of vehicle such as non-limiting example the heavy truck 10. As describe above, the method 100 consist on providing 110 a left corner radar sensor 26 and a right corner radar sensor 28 respectively mounted at the front left corner of the vehicle and at the front right corner of the vehicle. The method further comprises a step of transmitting 120 the object detection radar signal 54 from the left corner radar sensor 26 with the field of view 32 extending from the left side portion area 34 to the front portion area 38 covering respectively the left portion and the front portion of the vehicle. A similar step is done with the right corner radar sensor 28 such that the method comprise the step of transmitting 120 the other object detection radar signal 54 from the right corner radar sensor 28 with the other field of view 40 extending from the right side portion area 42 to the other front portion area 46 covering respectively the right portion and the front portion of the vehicle. The field of view 32, 40 of each corner radar sensor 26, 28 may extend a bit further up to the residual side field of view 36, 44 as said residual side field of view 36, 44 does not affect the issue of solving the horizontal azimuth discrimination. A further step of the method comprises 130 reducing each field of view 32, 40 of each corner radar sensor 26, 28 to their front portion area 38, 46 and monitoring 140 the presence of an object in the common field of view 48 of the front portion areas field of view 38, 46 of both corner radar sensors 26, 28.

Preferably the method 100 further comprises a step of triggering 150 an alert if the object is detected by both right and left corner radar sensors 26, 28 in a distance range less than the safety distance threshold 50 representative of the minimum safety distance for which the vehicle may automatically operate in a go function from a standstill situation. As related above, the step of reducing each field of view may consist on blocking the portion of the object detection signal 54 by absorbing it via an specific absorber material, or by reflecting out of each corner radar sensor 26, 28 the portion of each object detection radar signal 72 that would have covered the side portion area 34, 42 of each field of view 32, 40 of each corner radar sensor 26, 28.

Figure 6:
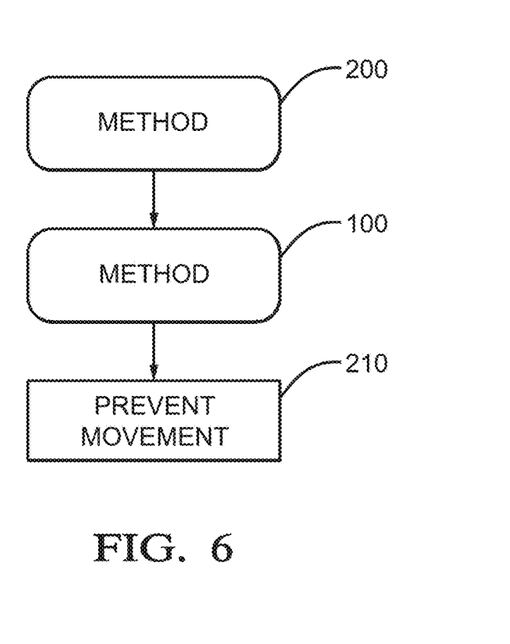
FIG. 6 is a schematic view of a block diagram of a method for controlling a stop and go system of the heavy truck according to the embodiment of FIG. 2.

FIG. 6 illustrates a non-limiting example of a method 200 for controlling a stop and go system of the heavy truck 10, whereby the heavy truck 10 may automatically operates in a go mode from a standstill situation. That method 200 comprises the steps of the method 100 for controlling the radar system 24 of the heavy truck 10 including the step of triggering the alert 150 if the object is detected by both right and left corner radar sensors in the distance range less than the safety distance threshold 50. Then, the method 200 for controlling the stop and go system comprises a step of preventing 210 the go function of the heavy truck 10 from a standstill situation if the alert is triggered.

We claim:

1. A method, comprising:
receiving, with a controller, radar data from a first radar sensor and a second radar sensor mounted to a vehicle;
determining, with the controller, based on fields of view of both the first radar sensor and the second radar sensor, reduced fields of view that overlay a travel path of the vehicle,
wherein the reduced fields of view are enabled by reflecting portions of transmitted radar signals away from both the first radar sensor and the second radar sensor, thereby inhibiting detections of objects outside of the travel path of the vehicle; and
determining, with the controller, whether an object is detected by both the first radar sensor and the second radar sensor in the reduced fields of view while the vehicle is stationary.

2. The method in accordance with claim 1, wherein the controller prevents a motion of the vehicle when the object is detected at a distance less than a threshold.

3. The method in accordance with claim 1, wherein the controller activates an alert when the object is detected at a distance less than a threshold.

4. The method in accordance with claim 1, wherein the object is detected by both the first radar sensor and the second radar sensor at a same distance from the vehicle.

5. The method in accordance with claim 1, wherein the first radar sensor and the second radar sensor are mono-pulse short range radar sensors.

6. The method in accordance with claim 1, wherein the portions of transmitted radar signals are reflected in a direction such that a return signal from the reflected signals is not detectable by the first radar sensor and the second radar sensor.

7. The method in accordance with claim 6, wherein the controller reflects the portions of transmitted radar signals by positioning moveable shutters in the fields of view.

8. The method in accordance with claim 7, wherein the fields of view are of transmission antennas of the first radar sensor and the second radar sensor.

9. The method in accordance with claim 1, wherein the vehicle is stationary.

10. The method in accordance with claim 1, wherein the object is stationary.

11. A system, comprising:
a controller configured to:
receive radar data from a first radar sensor and a second radar sensor mounted to a vehicle;
determine, based on fields of view of both the first radar sensor and the second radar sensor, reduced fields of view that overlay a travel path of the vehicle,
wherein the reduced fields of view are enabled by reflecting portions of transmitted radar signals away from both the first radar sensor and the second radar sensor, thereby inhibiting detections of objects outside of the travel path of the vehicle; and
determine whether a stationary object is detected by both the first radar sensor and the second radar sensor in the reduced fields of view while the vehicle is stationary.

12. The system in accordance with claim 11, wherein the controller prevents a motion of the vehicle when the object is detected at a distance less than a threshold.

13. The system in accordance with claim 11, wherein the controller activates an alert when the object is detected at a distance less than a threshold.

14. The system in accordance with claim 11, wherein the stationary object is detected by both the first radar sensor and the second radar sensor at a same distance from the vehicle.

15. The system in accordance with claim 11, wherein the first radar sensor and the second radar sensor are mono-pulse short range radar sensors.

16. The system in accordance with claim 11, wherein the portions of transmitted radar signals are reflected in a direction such that a return signal from the reflected signals is not detectable by the first radar sensor and the second radar sensor.

17. The system in accordance with claim 16, wherein the controller reflects the portions of transmitted radar signals by positioning moveable shutters in the fields of view.

18. The system in accordance with claim 17, wherein the fields of view are of transmission antennas of the first radar sensor and the second radar sensor.

19. The system in accordance with claim 11, wherein the vehicle is stationary.

20. The system in accordance with claim 11, wherein the object is stationary.

\* \* \* \* \*